Figure 1:
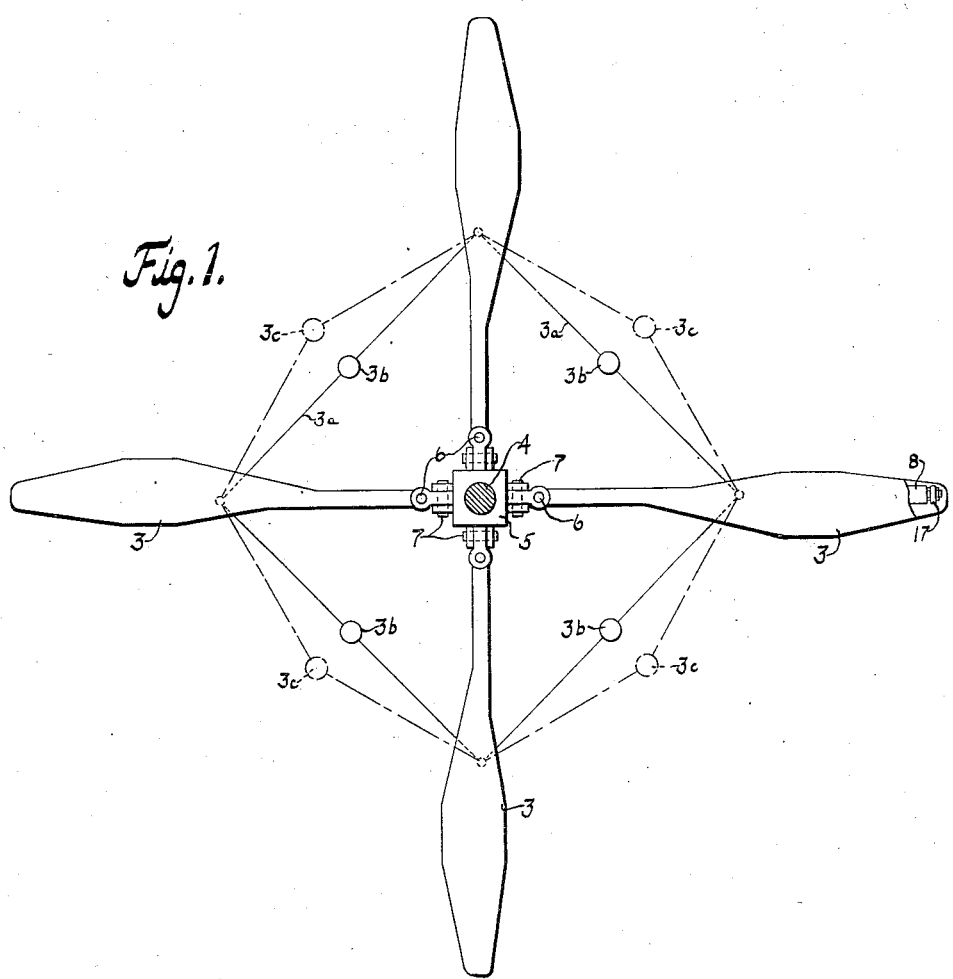

Oct. 25, 1932.  J. DE LA CIERVA  1,884,598
ROTATIVE SUSTAINING BLADES FOR AIRCRAFT

Original Filed Nov. 1, 1926

INVENTOR.
Juan de la Cierva
BY
Symmestvedt + Lechner
ATTORNEYS.

Patented Oct. 25, 1932

1,884,598

UNITED STATES PATENT OFFICE

JUAN DE LA CIERVA, OF MADRID, SPAIN, ASSIGNOR TO AUTOGIRO COMPANY OF AMERICA, OF PHILADELPHIA, PENNSYLVANIA, A CORPORATION OF DELAWARE

ROTATIVE SUSTAINING BLADES FOR AIRCRAFT

Original application filed November 1, 1926, Serial No. 145,655, and in Great Britain November 19, 1925. Divided and this application filed November 26, 1930. Serial No. 498,301.

This invention relates to rotative sustaining blades for aircraft and is particularly concerned with the type of structure which includes a set of sustaining blades which are mounted for rotation about a common substantially vertically disposed axis. The invention furthermore is especially useful in connection with aircraft of the above noted general type in which the sustaining blades are mounted for actuation by relative air-flow such as results, for example, from movement of the craft through the atmosphere.

This application is a division of my copending application Serial No. 145,655, filed November 1, 1926, issued May 24, 1932, as Patent No. 1,859,584.

In considering the general nature, as well as the objects and advantages of the present invention, it should be borne in mind that in aircraft of this general type it is preferable to employ pivot or articulated joints between the individual wings or blades and the mounting structure therefor, or other flexible means, in order that the blades may be free independently to assume various positions under the influence of forces resulting from rotation of the rotor construction, as well as from translational movement of the craft in the atmosphere. Among such forces might be mentioned centrifugal, lift, drag and anti-drag and the like.

In addition to the foregoing it should be borne in mind that the rotation of the sustaining blades is such as to produce very high linear blade speed near the outer ends thereof, with the result that the centrifugal action during rotation is very great and the strains to which the blades are subjected are correspondingly heavy. Furthermore, and especially where the rotor construction is designed for actuation by air-flow, it is desirable that the structure of the blades should be relatively light in order to maintain the total weight of the construction at a low value. However, particularly where relatively light construction is used, it has been found to be desirable to augment the action of centrifugal force on each blade so that it will be maintained during flight operation in the position which affords a high degree of sustension.

In order to meet the above noted circumstances, the present invention contemplates the utilization of a relatively light blade construction, and, at the same time, the application of weight means at or near the outer end of each blade. In this way the total weight of the blades may be reduced while the action of centrifugal force on the weight means, which are located at the point at which they produce the greatest centrifugal effect, is sufficient to maintain the blades in their most efficient positions during rotation thereof, such positions varying during rotation, with each blade assuming the position of equilibrium under the action of centrifugal, lift and other forces.

Another object of the invention is the provision of means for carrying the weight means, as against the action of centrifugal force thereon, at least partially independently of the blade structure. Additionally, the means for carrying the weight means may be arranged to carry, in a similar manner, at least a portion of the centrifugal action of the blade itself.

Still further the present invention contemplates the use of adjustable weights so that the blades of any particular set may be balanced uniformly as to the effect of the centrifugal force thereon.

Figure 2:
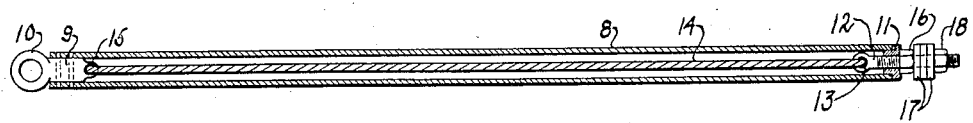

The general nature of the invention, as well as objects and advantages, in addition to those noted above, will be still more apparent from a consideration of the following description, taken in connection with the accompanying drawing which illustrates a preferred embodiment of the invention and in which Fig. 1 is a somewhat diagrammatic top view of an air driven rotor construction embodying the improvements of this invention; and Fig. 2 is an enlarged horizontal longitudinal sectional view of a portion of a blade structure illustrating in more detail the application of the weight means and associated parts.

In Fig. 1 the sustaining blades are indicated by the reference numeral 3 and from inspection of this figure it will be seen that in this instance the rotor construction includes a set of four such blades mounted for rotation about the shaft or axis 4. The blades as noted above are pivoted or articulated to the hub member 5 by means of joints such as indicated at 6 and 7, the said joints being arranged to provide pivotal movement of the blades individually and independently of each other on substantially horizontally disposed axes, as well as substantially vertically disposed axes.

In order to yieldingly restrain various of the blade movements or displacements, blade interconnections including cables 3a and weights 3b may be employed. These blade interconnections are preferably of length greater than the distance between the points of attachment thereof to the blades, with the latter in normal or radial position, so that during operation or rotation the weights 3b move outwardly as indicated at 3c and cooperate with each other to yieldingly resist individual blade movements under the influence of various forces such as those noted above.

In accordance with the showing of Fig. 2, each blade preferably includes a tubular main spar or beam 8 on which other parts of the blade structure are built. At the inner end of each blade the tubular member 8 is provided with a mounting part 9 which has an eye 10 adapted to cooperate with other parts of the supporting structure, such, for example, as the pivot pin 6. At its outer end the tube 8 may be provided with a cap or closure such as indicated at 11 which is apertured to permit the threaded bolt 12 to slide therethrough. At its inner end the bolt 12 has an eye 13 to which is secured a tension member—for example, the cable 14—the latter being extended therefrom through the tube 8 inwardly to the blade mounting part 9. At the inner end the cable 14 may be secured to the part 9 by means of a similar eye 15.

Beyond the outer end of the spar 8 and outside of the cap 11 the bolt 12 carries a nut 16 which may be drawn up sufficiently to relieve the tubular spar of some tension stresses or to place the tubular spar at least partially under compression while at rest or at slow speeds of rotation. The bolt 12 furthermore is extended outwardly a sufficient distance to permit of the application of one or more weights 17 which are held in place thereon by means of a nut 18.

In considering the operation of my improved construction it should be noted that during rotation of the blades about the shaft 4, the thrust incident to the action of centrifugal force on the outer or sustaining portions of the blades may be taken or carried, at least partially, by the tension member or cable 14. In this way the thrust and stresses caused by centrifugal force may be taken directly by the blade mounting structure, with the result that the blade itself, and particularly the inner portions thereof, may be substantially relieved of such stresses if desired.

In addition it should be observed that this type of structure permits the application of weight means at the point where they are most effective without imposing additional thrusts or strains on the blades.

As a result the construction of such blades may be made relatively light and at the same time the effect of centrifugal force may be maintained at any desired value. Still further, it should be noted that the construction is such as to provide convenient adjustment of the weight means, this being accomplished by the application of one or more weights 17 to the outer end of the blade where the centrifugal action is greatest. The result is that only very small weights need be used to produce substantial changes in the action of centrifugal force, which may thus be made to balance the lift force within a predetermined range of displacement of the blade transversely of its general path of travel.

Similarly, it will be seen that the balance desired between the effect of the blade interconnections and the effect of the centrifugal action of the blades themselves can be nicely adjusted.

According to the foregoing, therefore, the structure of the present invention attains the objects and advantages specifically referred to above by the use of a blade construction which is simple and rugged. Additionally, the present invention results in very smooth and even operation of rotors of the type hereinbefore referred to, so that, in general, the operation of the type of aircraft in question is greatly enhanced.

I claim:—

1. A rotative sustaining unit for an aerial device, including a plurality of sustaining blades mounted for rotation about a common axis under the action of relative air-flow, means providing for individual blade displacement under the influence of lift and other forces, and adjustable weight means on said blades.

2. A rotative sustaining unit for an aerial device, including a plurality of sustaining blades mounted for rotation about a common axis under the action of relative air-flow, means providing for individual blade displacement under the influence of lift and other forces, means yieldingly resistive to blade displacement, and means of adjusting the relative effect of said resistive means and the centrifugal action of the blade.

3. An air-actuated and rotatively mounted sustaining blade of the character described including weight means in the outer portion of the blade and means taking the outward thrust produced by the action of centrifugal force on said weight means independently at least of the effective sustaining portion of said blade.

4. An air-actuated and rotatively mounted sustaining blade of the character described having a blade mounting part at the inner end thereof, weight means in the outer portion of the blade and tension means connected with said mounting part and said weight means.

5. A rotatively mounted sustaining blade of the character described having a blade mounting part at the inner end thereof, adjustable weight means in the outer portion of the blade and tension means connected with said mounting part and said weight means.

6. A rotatively mounted sustaining blade of the character referred to having a blade mounting part at the inner end thereof and adjustable weight means in the outer portion thereof carried, as against the action of centrifugal force thereon, by said mounting part.

7. A rotatively mounted sustaining blade for an aircraft including means associated with the blade for relieving the inner portion thereof of tension placed thereon by the action of centrifugal force on the outer portion thereof during its rotation, said means including a tension member secured at one end to the blade in its outer end portion and at the other end to the blade mounting, together with weight means carried, as against the action of centrifugal force thereon, by said tension member.

8. A rotatively mounted sustaining blade for an aircraft including means associated with the blade for relieving the inner portion thereof of tension placed thereon by the action of centrifugal force on the outer portion thereof during its rotation, said means including a structural member extending longitudinally of the blade and means associated therewith and serving to impose a compression force on said member, together with a weight carried, as against the action of centrifugal force thereon, by the last mentioned means.

9. A rotatively mounted sustaining blade for an aircraft including means associated with the blade for relieving the inner portion thereof of tension placed thereon by the action of centrifugal force on the outer portion thereof during its rotation, said means including a hollow structural member extending longitudinally of the blade and having a blade mounting part at the inner end thereof and a tension member positioned within said member and connected with said mounting part and with the outer end of said member, together with weight means carried, as against the action of centrifugal force thereon, by said tension member.

10. A rotatively mounted sustaining blade for an aircraft including means associated with the blade for relieving the inner portion thereof of tension placed thereon by the action of centrifugal force on the outer portion thereof during its rotation, said means including a tension member secured at one end to the blade in its outer end portion and at the other end to the blade mounting.

11. A rotatively mounted sustaining blade for an aircraft including means associated with the blade for relieving the inner portion thereof of tension placed thereon by the action of centrifugal force on the outer portion thereof during its rotation, said means including a structural member extending longitudinally of the blade and means associated therewith and serving to impose a compression force on said member.

12. A rotatively mounted sustaining blade for an aircraft including means associated with the blade for relieving the inner portion thereof of tension placed thereon by the action of centrifugal force on the outer portion thereof during its rotation, said means including a structural member extending longitudinally of the blade and having a blade mounting part at the inner end thereof and a tension member connected with said mounting part and with said member adjacent its outer end.

13. A rotatively mounted sustaining blade for an aircraft including means associated with the blade for relieving the inner portion thereof of tension placed thereon by the action of centrifugal force on the outer portion thereof during its rotation, said means including a hollow structural member extending longitudinally of the blade and means associated therewith in such manner as to impose a compression force on said member.

14. A rotatively mounted sustaining blade for an aircraft including means associated with the blade for relieving the inner portion thereof of tension placed thereon by the action of centrifugal force on the outer portion thereof during its rotation, said means including a hollow structural member extending longitudinally of the blade and means positioned internally of said member and associated therewith in such manner as to impose a compression force on said member.

15. A rotatively mounted sustaining blade for an aircraft including means associated with the blade for relieving the inner portion thereof of tension placed thereon by the action of centrifugal force on the outer portion thereof during its rotation, said means including a hollow structural member extending longitudinally of the blade and having a blade mounting part at the inner end thereof and a tension member positioned within said member and connected with said mounting part and with the outer end of said member.

16. In a rotative hinged-wing system of the type referred to, spar means and tie means running lengthwise of a wing and supported at the inner end thereof, the outer end thereof being provided with adjustable means acting upon the longitudinal spar means in such wise that by putting said tie means in tension, the spar means is relieved of part of the tension stress to which it is subjected during rotation of the wing.

17. In an aircraft, a hinged and rotatively mounted sustaining wing or blade and means for adjusting the center of gravity of the blade including readily removable weight means associated therewith.

18. In an aircraft, a hinged and rotatively mounted sustaining wing or blade and means for adjusting the center of gravity of the blade including readily removable weight means associated therewith in the region of the blade tip.

19. For an aircraft, a rotary sustaining wing system including a generally upright axis structure, wing means mounted thereon for rotation, means of flexible connection of the wing means to the axis structure, all so arranged that the wing means are held extended, to support the craft, by the action of centrifugal force of rotation, and adjustable weight means for said wing means.

In testimony whereof I have hereunto signed my name.

JUAN DE LA CIERVA.